(12) United States Patent
Obana et al.

(10) Patent No.: US 6,383,962 B1
(45) Date of Patent: May 7, 2002

(54) ALUMINUM NITRIDE SINTERED PRODUCT

(75) Inventors: Yoshiki Obana; Atsuo Hiroi; Kazunari Watanabe; Mikio Ueki, all of Chiba; Yukihiro Kitamura, Tokyo, all of (JP)

(73) Assignees: Asahi Techno Glass Corporation, Funabashi (JP); Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/526,554

(22) Filed: Mar. 16, 2000

(30) Foreign Application Priority Data

Mar. 17, 1999 (JP) ............................................. 11-071587

(51) Int. Cl.$^7$ ..................... C04B 35/581; C04B 35/582
(52) U.S. Cl. ..................... 501/98.4; 501/98.6
(58) Field of Search ................................. 501/98.4, 98.6

(56) References Cited

U.S. PATENT DOCUMENTS 5,147,832 A * 9/1992 Shimoda et al. ............ 501/98.4
5,294,388 A * 3/1994 Shimoda et al. ............ 501/98.4
5,306,679 A * 4/1994 Shimoda et al. ............ 501/98.4

FOREIGN PATENT DOCUMENTS

| EP | 0 472 776 | 3/1992 |
| JP | 4-132666 | 5/1992 |
| JP | 6-329474 | 11/1994 |

* cited by examiner

*Primary Examiner*—Karl Group
(74) *Attorney, Agent, or Firm*—Oblon, Spivak, McClelland, Maier & Neustadt, P.C.

(57) ABSTRACT

An aluminum nitride sintered product which is made mainly of aluminum nitride and contains an yttrium compound in an amount of from 0.6 to 5 wt % as calculated as yttrium oxide, a vanadium compound in an amount of from 0.02 to 0.4 wt % as calculated as vanadium and carbon in an amount of from 0.03 to 0.10 wt % and which has a three-point bending strength of at least 45 kg/mm and a thermal conductivity of at least 150 W/m·K, wherein crystal grains of aluminum nitride have an average grain size of at most 5 μm.

12 Claims, No Drawings

ALUMINUM NITRIDE SINTERED PRODUCT

BACKGROUND OF THE INVENTION

1. Field of the Invention

The present invention relates to an aluminum nitride sintered product and a process for its production.

2. Discussion of Background

An aluminum nitride sintered product has a theoretical thermal conductivity as high as 320 W/m·K, and it is excellent also in the mechanical strength and electrical properties at a level of alumina. Accordingly, it has recently been widely used as a substrate material for a semiconductor power module such as GTO (gate turn off thyristor) or IGBT (insulted gate bipolar transistor) which requires high levels of electrical insulating properties and heat dissipation properties. As common properties of aluminum nitride sintered products which are industrially used for semiconductor power modules, the thermal conductivity is from 130 to 200 W/m·K, and the three-point bending strength (hereinafter referred to simply as the bending strength) is from 30 to 40 kg/mm$^2$. For such a semiconductor power module, a copper-bonded substrate is widely used, wherein a copper sheet is bonded to an aluminum nitride substrate via an active metal layer or the like. In this copper-bonded substrate, there is a substantial difference in thermal expansion between aluminum nitride and the copper sheet, and cracks are likely to form in the aluminum nitride sintered product by heat treatment at the time of mounting electronic elements on the copper-lined substrate or by heat cycle exerted when it is used as a semiconductor power module, whereby the reliability as a semiconductor power module tends to be impaired. Accordingly, as an aluminum nitride substrate for such a semiconductor power module, one excellent in the bending strength, is required.

Aluminum nitride sintered products having the above properties are mass produced by the following method. Namely, a sintering aid such as yttrium oxide and an organic binder are blended to an aluminum nitride material powder, and the blend is molded into a molded product by e.g. a doctor blade method or a press-molding method. Then, this molded product is heated in air or in a nitrogen atmosphere to remove the binder, and then the molded product is sintered in a nitrogen atmosphere under an ambient pressure to obtain a sintered product. The thermal conductivity of an aluminum nitride sintered product depends largely on the amount of oxygen contained in the aluminum nitride crystal grains. Namely, by reducing the oxygen content, it is possible to obtain an aluminum nitride sintered product having a high thermal conductivity. According by using an aluminum nitride material powder having a small oxygen content or by incorporating carbon to an aluminum nitride material powder and reacting the carbon with the contained oxygen during the sintering process in a nitrogen atmosphere to remove the contained oxygen, sintered products showing a high thermal conductivity at a level of 200 W/m·K are mass-produced.

Further, many attempts have been made for the purpose of improving the bending strength of the aluminum nitride sintered product. For example, (a) it has been attempted to improve the strength by incorporating a Si component to control growth of aluminum nitride crystal grains during sintering thereby to form a sintered product having fine, dense aluminum nitride crystal grains (JP-A-6-329474, etc.), and (b) it has been attempted to increase the strength by dispersing fine particles (nano particles) of titanium oxide or the like in the crystal grains and grain boundaries of the aluminum nitride sintered product (JP-A-4-132666).

However, these methods for improving the strength have problems respectively and have not been practically employed. For example, in the above method (a), the Si component present in the aluminum nitride sintered product tends to lower the thermal conductivity, whereby it tends to be difficult to obtain high strength and high thermal conductivity at the same time. On the other hand, in the above method (b), the step for preparation of nano particles, the step for uniformly dispersing nano particles in the sintered product, etc., are cumbersome, and it has been difficult to adopt such a method widely on an industrial basis.

SUMMARY OF THE INVENTION

It is an object of the present invention to solve the above-mentioned problems of the prior art and to provide an aluminum nitride sintered product which can be produced constantly on an industrial basis, which has both high strength and high thermal conductivity and which is suitable for an aluminum nitride substrate for a semiconductor power module, and a process for its production.

The present invention provides an aluminum nitride sintered product which is made mainly of aluminum nitride and contains an yttrium compound in an amount of from 0.6 to 5 wt % as calculated as yttrium oxide, a vanadium compound in an amount of from 0.02 to 0.4 wt % as calculated as vanadium and carbon in an amount of from 0.03 to 0.10 wt % and which has a three-point bending strength of at least 45 kg/mm$^2$ and a thermal conductivity of at least 150 W/m·K, wherein crystal grains of aluminum nitride have an average grain size of at most 5 μm.

The present invention also provides a process for producing an aluminum nitride sintered product, which comprises molding a blend material prepared by blending a carbon material and a binder to a composition comprising from 0.6 to 5 wt % of yttrium oxide, from 0.02 to 0.4 wt %, as calculated as vanadium, of vanadium oxide and the rest being an aluminum nitride material powder, into a molded product of a predetermined shape, then heating the molded product in air to remove the binder from the molded product and then sintering the molded product having the binder removed therefrom, in a non-oxidizing atmosphere, wherein the content of the carbon material in the blend material is from 0.5 to 0.8 time by weight the amount of oxygen contained in the aluminum nitride material powder.

DETAILED DESCRIPTION OF THE PREFERRED EMBODIMENTS

In the aluminum nitride sintered product of the present invention, if the average grain size of aluminum nitride crystal grains exceeds 5 μm, the strength tends to deteriorate. The maximum grain size of the aluminum nitride crystal grains in the sintered product is preferably less than 15 μm.

In the present invention, the average grain size of the aluminum nitride crystal grains, is determined as follows.

With respect to a fracture surface of a sintered product, a SEM photograph with 2,000 magnifications is taken, and an optional linear line (a length of about 120 μm) is drawn on the photograph. Then intersecting points of this linear line with grain boundaries of each crystal grain, are determined, and the length between the intersection points of each crystal grain is taken as the grain size of that crystal grain. Thus, the arithmetic average of grain sizes of the respective crystal grains is taken as the average grain size.

Further, the maximum grain size of crystal grains is determined in such a manner that with respect to a fracture surface of a sintered product, a SEM photograph with 1,000 magnifications, is taken, then, the maximum crystal grain is specified on the photograph (within an area of about 80×120 μm) and the maximum diameter of that crystal grain is taken as the maximum grain size.

The yttrium compound serves as a sintering aid and will remain in the sintered product. If its content is less than 0.6 wt % as calculated as yttrium oxide, the product tends to be porous, and the strength of the sintered product tends to be low. On the other hand, if its content exceeds 5 wt % as calculated as yttrium oxide, the yttrium compound tends to partially agglomerate on the surface of the sintered product, and the surface roughness tends to increase. Such an yttrium compound may, for example, be yttrium oxide or yttrium aluminum oxide ($Y_4Al_2O_9$).

The vanadium compound serves to promote sinterability at the time of sintering and will remain in the sintered product. The vanadium compound may, for example, be $V_2O_3, V_2O_4$ or $V_2O_5$. If its content is less than 0.02 wt % as calculated as vanadium, deformation of the sintered product is likely to occur, and if it exceeds 0.4 wt %, the aluminum nitride crystal grains tend to be too large, whereby the strength of the sintered product tends to be low.

Further, if the bending strength is less than 45 kg/mm$^2$, the strength is inadequate, such being practically useless. If the thermal conductivity is less than 150 W/m·K, such a sintered product can not be used for an application where heat dissipation is required.

Such a sintered product is obtainable by blending yttrium oxide, vanadium oxide, carbon and a binder in predetermined amounts, respectively, to an aluminum nitride material powder and sintering the blend material.

The carbon material serves to improve the strength by suppressing growth of aluminum nitride crystal grains at the time of sintering. Such a carbon material is preferably employed in the form of a powder. The content of the carbon material is adjusted to be within a range of from 0.5 to 0.8 time by weight the amount of oxygen contained in the aluminum nitride material powder to be used. If the content of the carbon material is smaller than 0.5 time, the effect for suppressing the growth of aluminum nitride crystal grains tends to be inadequate, and if it exceeds 0.8 time, it tends to be difficult to obtain a dense sintered product, and the strength tends to be low. More preferably, it is within a range of from 0.6 to 0.74 time.

Such a carbon material may, for example, be one which is not substantially susceptible to oxidation or decomposition in the binder removal step of heating in air to remove the binder from the molded product. Specifically, such a carbon material is preferably carbon having a crystal structure which is not susceptible to oxidation or decomposition by heat treatment at 460° C. in air. For example, graphite or carbon black which is not susceptible to oxidation or decomposition by heat treatment at 460° C. in air, may be mentioned.

If carbon which is susceptible to oxidation or decomposition by heat treatment at a temperature of lower than 450° C., e.g. from 380° C. to lower than 450° C., in air in the binder removal step, is used, there will be non-uniformity in the amount of carbon in the molded product after removal of the binder, whereby not only it becomes difficult to obtain a sintered product having the growth of aluminum nitride crystal grains uniformly suppressed, but also there will be non-uniformity in the sinterability of the molded product, whereby substantial warping or deformation of the sintered product is likely to take place during sintering. Further, if the particle size of the carbon powder is too large, it may leave pores in the sintered product, thus leading to deterioration of the strength. The maximum particle size of the carbon powder is preferably 10 μm, more preferably at most 5 μm.

Yttrium oxide will form a liquid phase in cooperation with an oxidized layer on the surface of the aluminum nitride material powder in the sintering process in a non-oxidizing atmosphere, and it serves to promote densification of the aluminum nitride sintered product. If the content of yttrium oxide is less than 0.6 wt %, a dense sintered product tends to be hardly obtainable, and if it exceeds 5 wt %, oozing out of the liquid phase to the surface of the sintered product tends to increase, whereby the strength tends to deteriorate, and non-uniformity in the strength tends to increase.

Vanadium oxide serves to promote sinterability thereby to suppress non-uniformity of the sinterability in the sintered product. If its content is less than 0.02 wt % as calculated as vanadium, its effect tends to be inadequate, whereby deformation during sintering can not be suppressed, and non-uniformity in strength is likely to result, and if it exceeds 0.4 wt %, aluminum nitride crystal grains are likely to grow too much, whereby the strength tends to deteriorate. Such vanadium oxide may, for example, be $V_2O_3$, $V_2O_4$ or $V_2O_5$.

The aluminum nitride sintered product of the present invention may further contain not more than 0.1 wt % of other components, as the case requires.

The aluminum nitride material powder to be used in the present invention may be one prepared by any method. However, preferred is one having an average particle size of at most 2 μm. If the average particle size exceeds 2 μm, the aluminum nitride crystal grains in the aluminum nitride sintered product tend to be too large, whereby the strength tends to deteriorate.

Further, if the amount of oxygen contained in the aluminum nitride material powder is too large, the reaction time to remove the contained oxygen tends to be long, such being uneconomical. Such an oxygen content is preferably at most 2 wt %, more preferably at most 1.5 wt %.

The binder will be removed from the molded product as it will be oxidized and decomposed when heated in air. The oxidation initiating temperature of aluminum nitride is about 460° C., and as the binder, one which will be oxidized and decomposed when heated at a temperature lower than this temperature, will be employed. Specifically, one having a dispersant, a plasticizer or a solvent added to a resin such as polyvinyl butyral or an acrylic resin, may be employed. The content of the binder is suitably selected within a range wherein the molding operation to obtain a molded product is easy, and removal of the binder in the binder removal step, is easy.

A carbon material and a binder are blended to a composition comprising an aluminum nitride material powder, yttrium oxide and vanadium oxide in the above-mentioned proportions, to obtain a blend material. This blend material is molded into a molded product of a predetermined shape such as a plate shape. As such a molding method, press-molding or doctor blade molding may, for example, be employed.

Then, the molded product is heated in air to remove the binder from the molded product. The temperature for this heating is a temperature lower than 460° C. as mentioned above. Further, in consideration of the productivity, it is preferably within a range of from 400 to 460° C. This heating time varies depending upon the thickness of the molded product, the amount of the binder, etc., and it is about 60 minutes in the case of a molded product having a thickness of about 1 mm.

Now, the present invention will be described in further detail with reference to Examples. However, it should be understood that the present invention is by no means restricted to such specific Examples.

EXAMPLES 1 to 8

A composition comprising 2.2 wt % of yttrium oxide having an average particle size of 0.3 μm, 0.07 wt %, as calculated as vanadium, of vanadium trioxide and the rest being an aluminum nitride starting powder, was prepared by using an aluminum nitride starting powder prepared by a direct nitriding method and having an average particle size of 1.5 μm and an oxygen content of 1.2 wt %. To this composition, a graphite powder having an average particle size of 1 μm (specific surface area: 3 m$^2$/g) was blended as a carbon material. In the column for "C/O" in Table 1, the content of the graphite powder is shown by the ratio (by weight) to the oxygen content of the aluminum nitride material powder.

In Table 1, Examples 1 to 4 represent Working Example of the present invention, and Examples 5 to 8 represent Comparative Examples.

TABLE 1

|  | C/O | Bending strength (kg/mm$^2$) | Average grain size (μm) | Maximum grain size (μm) | Thermal conductivity (W/m·K) | Warpage (μm) | Contents of graphite powder in the blended material (wt %) | Contents of carbon in the sintered product (wt %) |
| --- | --- | --- | --- | --- | --- | --- | --- | --- |
| Ex. 1 | 0.5 | 50 | 3.8 | 12 | 175 | ◯ | 0.6 | 0.04 |
| Ex. 2 | 0.6 | 51 | 3.5 | 9 | 183 | ◯ | 0.7 | 0.05 |
| Ex. 3 | 0.7 | 56 | 3.3 | 8 | 180 | ◯ | 0.8 | 0.06 |
| Ex. 4 | 0.8 | 52 | 3.1 | 8 | 184 | ◯ | 0.9 | 0.07 |
| Ex. 5 | 0 | 33 | 9.8 | 22 | 123 | ◯ | 0.0 | <0.01 |
| Ex. 6 | 0.2 | 41 | 8.5 | 18 | 147 | ◯ | 0.2 | 0.02 |
| Ex. 7 | 0.4 | 44 | 5 | 16 | 171 | ◯ | 0.5 | 0.03 |
| Ex. 8 | 0.9 | 44 | 3 | 9 | 165 | ◯ | 1.1 | 0.09 |

Then, the molded product having the binder removed therefrom, is heated to a temperature of from 1,700° C. to the sintering temperature in a non-oxidizing atmosphere over a period of from 1 to 5 hours and then sintered by maintaining it at the sintering temperature for from 1 to 5 hours. This sintering temperature is within a range of from 1,900 to 2,000° C. The non-oxidizing atmosphere may, for example, be nitrogen gas, helium gas, argon gas or a vacuumed atmosphere. If the sintering temperature is lower than 1,900° C., it tends to be difficult to obtain a dense sintered product, and if it exceeds 2,000° C., the growth of the aluminum nitride crystal grains tends to progress, whereby it tends to be difficult to obtain aluminum nitride crystal grains having an average grain size of at most 5 μm.

The aluminum nitride sintered product thus obtained, has a fine structure such that the average grain size of aluminum nitride crystal grains is at most 5 μm, and has high thermal conductivity and high strength such that the thermal conductivity is at least 150 W/m·K and the bending strength is at least 45 kg/mm$^2$, and it is particularly suitable as a substrate for a semiconductor power module.

Then, to 100 parts by weight of this blend having the graphite powder incorporated, a binder comprising 2 parts by weight of a dispersant, 10 parts by weight of polyvinyl butyral, 5 parts of dibutyl phthalate as a plasticizer and an organic solvent such as toluene, was blended to obtain a slurry. Then, this slurry was molded into a green sheet by a doctor blade method, and the obtained green sheet was punched out in a predetermined shape to obtain a plate-shaped molded product.

On the other hand, a boron nitride powder having an average particle size of 0.8 μm was suspended in acetone, and the suspension was applied to both sides of the above molded product by a spray method. The coated amount was 0.5 mg/cm$^2$. Then, 10 sheets of the molded product having the boron nitride powder coated thereon, were piled up on a boron nitride container.

The sheets were heated in air at 440° C. for 3 hours to remove the binder. Then, they were accommodated and sealed in the boron nitride container, heated in a nitrogen atmosphere to a level of from 1,700 to 1,950° C. over a period of 3 hours and then continuously maintained at 1,950° C. for 3 hours for sintering, to obtain a sintered product having a size of 50 mm×50 mm and a thickness of 0.635 mm.

The obtained sintered product was cut out in a strip shape with a width of 10 mm to obtain a test specimen of 50 mm×10 mm×0.635 mm. With respect to 10 such specimens, the bending strength with a span of 30 mm was measured, and the average value was taken as the bending strength. The results are shown in the column for "Bending strength" in Table 1 (unit: kg/mm$^2$) Further, with respect to this sintered product, the average grain size and the maximum grain size of the aluminum nitride crystal grains were measured and presented in the columns for "Average grain size" and "Maximum grain size" in Table 1 (unit: $\mu$m).

Further, the thermal conductivity of this sintered product was measured by a two-dimensional method of a laser flash method, and the results are shown in the column for "Thermal conductivity" in Table 1 (unit: W/m·K).

On the other hand, warpage of this sintered product was also measured. With respect to the warpage of the sintered product, the waviness profile was read along the short side edge direction of the strip by a laser meter, and the width between the ridge and the bottom of the profile was read out. Symbol ◯ indicates that this read out value was smaller than 50 $\mu$m. and symbol X indicates that the read out value was at least 50 $\mu$m. The results are shown in the column for "Warpage" in Table 1.

Further, the contents of the yttrium compound and the vanadium compound in these sintered products were measured, whereby the former was found to be 2.2 wt % as calculated as yttrium oxide, and the latter was found to be 0.07 wt % as calculated as vanadium, i.e. they were the same as the contents in the initial compositions. The content of graphite powder in the blended material (wt %) and the contents of carbon in these sintered products are described in Table 1.

As is evident from Table 1, with respect to the sintered products of Examples 1 to 4, the average grain size of the aluminum nitride crystal grains was not more than 4.0 $\mu$m, the bending strength was at least 50 kg/mm$^2$, the thermal conductivity was at least 150 W/m·K, and the warpage was small in all cases. On the other hand, in Examples 5 to 8, both the bending strength and the thermal conductivity were small as compared with the Working Examples of the present invention.

EXAMPLES 9 to 12

Using the same compositions and the same process as in Examples 1 to 4, only the condition for sintering was changed. Namely, the temperature was raised to a level of from 1,700 to 1,950° C. over a period of 5 hours and then maintained at 1,950° C. for 5 hours to obtain sintered products. With respect to these sintered products, the same measurements as in Examples 1 to 4 were carried out, and the results are shown in Table 2. The units are the same as in Table 1. Further, the contents of the yttrium compound and the vanadium compound in these sintered products were measured, and they were found to be the same as the contents in the initial compositions. The content of graphite powder in the blended material (wt %) and the contents of carbon in these sintered products are described in Table 2.

TABLE 1

|  | Bending strength (kg/mm$^2$) | Average grain size ($\mu$m) | Maximum grain size ($\mu$m) | Thermal conductivity (W/m.K) | Warpage ($\mu$m) | Contents of graphite powder in the blended material (wt %) | Contents of carbon in the sintered product (wt %) |
| --- | --- | --- | --- | --- | --- | --- | --- |
| Ex. 9 | 45 | 4.8 | 15 | 210 | ◯ | 0.6 | 0.03 |
| Ex. 10 | 47 | 4.5 | 13 | 220 | ◯ | 0.7 | 0.04 |
| Ex. 11 | 48 | 4.3 | 11 | 220 | ◯ | 0.8 | 0.05 |
| Ex. 12 | 46 | 4.2 | 10 | 215 | ◯ | 0.9 | 0.06 |

As shown in Table 2, these sintered products had a bending strength of at least 45 kg/mm$^2$ and a thermal conductivity of at least 200 W/m·K.

EXAMPLES 13 to 22

Sintered products were prepared in the same manner as in Example 1 except that the contents of yttrium oxide and vanadium oxide in the composition were changed, and with respect to the sintered products, the same measurements as in Example 1 were carried out, and the results are shown in Table 3. In Table 3, Examples 13 to 18 are working Examples of the present invention, and Examples 19 to 22 are Comparative Examples. The content of yttrium oxide in the composition is shown in the column for "Y2O3" in Table 3, and the content, as calculated as vanadium, of vanadium oxide is shown in the column for "Y$_2$O$_3$" in Table 3. The units for the bending strength, grain size and thermal conductivity are the same as in Table 1. Further, the content of graphite was 0.7 time by weight the amount of oxygen contained in the aluminum nitride. Further, the contents of the yttrium compound and the vanadium compound in the sintered products were the same as in the initial compositions. And the contents of graphite powder in the blended material were 0.8 wt %, and the contents of the carbon in these sintered products were 0.06 wt %.

TABLE 1

|  | $Y_2O_3$ | $V_2O_3$ | Bending strength (kg/mm²) | Average grain size (μm) | Maximum grain size (μm) | Thermal conductivity (W/m.K) | Warpage (μm) | Contents of graphite powder in the blended material (wt %) | Contents of carbon in the sintered product (wt %) |
|---|---|---|---|---|---|---|---|---|---|
| Ex. 13 | 0.6 | 0.07 | 45 | 3.3 | 9 | 165 | ○ | 0.8 | 0.6 |
| Ex. 14 | 1.2 | 0.07 | 54 | 3.2 | 8 | 183 | ○ | 0.8 | 0.6 |
| Ex. 15 | 5.0 | 0.07 | 54 | 3.0 | 9 | 182 | ○ | 0.8 | 0.6 |
| Ex. 16 | 2.2 | 0.035 | 54 | 3.3 | 8 | 184 | ○ | 0.8 | 0.6 |
| Ex. 17 | 2.2 | 0.21 | 51 | 3.3 | 8 | 181 | ○ | 0.8 | 0.6 |
| Ex. 18 | 2.2 | 0.35 | 46 | 4.1 | 11 | 182 | ○ | 0.8 | 0.6 |
| Ex. 19 | 0.5 | 0.07 | 42 | 3.0 | 8 | 145 | ○ | 0.8 | 0.6 |
| Ex. 20 | 7.0 | 0.07 | 43 | 3.0 | 8 | 170 | ○ | 0.8 | 0.6 |
| Ex. 21 | 2.2 | 0.0 | 52 | 3.2 | 8 | 175 | X | 0.8 | 0.6 |
| Ex. 22 | 2.2 | 0.49 | 44 | 4.9 | 16 | 180 | ○ | 0.8 | 0.6 |

EXAMPLES 23 to 27

Carbon black having an average particle size of 0.02 μm, a specific surface area of 92 m²/g and an oxidation decomposition initiating temperature of 460° C., was blended to a composition comprising an aluminum nitride material powder produced by a direct nitriding method, having an average particle size of 2.0 μm and an oxygen content of 1.5 wt % and containing 5,000 ppm of Si impurities, 3,000 ppm of Fe impurities and at most 100 ppm of other impurities, yttrium oxide having an average particle size of 0.3 μm and a maximum particle size of 1 μm and vanadium oxide. Then, to 100 parts by weight of this blend material, 10 parts by weight of a butyral resin having a thermal decomposition completing temperature of at most 400° C. was incorporated and mixed in an organic solvent by a ball mill to obtain a slurry. The content of yttrium oxide in the composition was 2.2 wt %, the content of vanadium oxide was 0.07 wt % as calculated as vanadium, and the content of carbon black is shown in the column for "C/O" in Table 4 by the ratio (by weight) to the amount of oxygen contained in the aluminum nitride powder. Then, the obtained slurry was deformed in vacuum, subjected to the viscosity adjustment and molded into a sheet by a doctor blade method. The sheet was punched out in a predetermined size, and the sample thereby obtained was heated in air at 440° C., Then the temperature was raised to a level of from 1,700 to 1,950° C. in a nitrogen atmosphere over a period of 3 hours and continuously maintained at 1,950° C. for 3 hours for sintering to obtain an aluminum nitride sintered product having a size of 50×50 mm and a thickness of 0.65 mm. With respect to the obtained sintered product, measurements were carried out on the same items as in Example 1, and the results are shown in Table 4. In Table 4, Examples 23 to 25 are Working Examples of the present invention, and Examples 26 and 27 are Comparative Examples. The contents of the yttrium compound and the vanadium compound in the sintered products were the same as in the initial compositions. The units of the bending strength, average grain size, maximum grain size and thermal conductivity of the sintered products were the same as in Table 1.

TABLE 1

|  | C/O | Bending strength (kg/mm²) | Average grain size (μm) | Maximum grain size (μm) | Thermal conductivity (W/m.K) | Warpage (μm) | Contents of graphite powder in the blended material (wt %) | Contents of carbon in the sintered product (wt %) |
|---|---|---|---|---|---|---|---|---|
| Ex. 23 | 0.5 | 50 | 3.7 | 1.3 | 152 | ○ | 0.8 | 0.05 |
| Ex. 24 | 0.7 | 52 | 3.6 | 9 | 155 | ○ | 1.0 | 0.06 |
| Ex. 25 | 0.8 | 47 | 3.2 | 8 | 155 | ○ | 1.2 | 0.07 |
| Ex. 26 | 0.4 | 44 | 5.2 | 17 | 150 | ○ | 0.6 | 0.04 |
| Ex. 27 | 0.9 | 42 | 2.8 | 8 | 155 | X | 1.3 | 0.09 |

EXAMPLE 28

In accordance with the composition and the method as disclosed in Example 3, a sintered product was prepared except that only the carbon was changed to amorphous carbon having an oxidation decomposition initiating temperature of 380° C., an average particle size of 0.08 μm and a specific surface area of 30 m²/g. With respect to the obtained sintered product, the measurements were carried out by the same methods as described above, whereby the bending strength was found to be 38 kg/mm², the average grain size of the aluminum nitride crystal grains was 6.1 μm, and the thermal conductivity was 151 W/m·K. The content of carbon in the molded product after the removal of the binder, was analyzed and found to be 0.4 wt % on average, which was one half of 0.8 wt % incorporated at the time of the preparation. Further, the amounts of carbon at the center and the periphery of a sheet of the molded product, were analyzed, whereby non-uniformity with the maximum of 0.1 wt % was found. Further, the deformation and warpage of the sintered body were substantial. This Example is a Comparative Example.

EXAMPLE 29

Employing an insulation for mass production, 100 sintered products were prepared by the method as disclosed in Example 3, and 100 strips of 50 mm×10 mm×0.635 mm were cut out from the sintered products, whereupon the bending strength was evaluated. As a result, the average bending strength was 54 kg/mm$^2$, and the Weibul coefficient was 14. This Example is a Working Example of the present invention.

By employing the process for producing an aluminum nitride sintered product of the present invention, it becomes possible to readily obtain a sintered product having high strength and high thermal conductivity, which is excellent also in the mass producibility and the economical efficiency, and thus the industrial value of the process is significant. Further, the sintered product obtainable by the process can contribute to an improvement in the reliability of e.g. a copper-bonded aluminum nitride substrate.

What is claimed is:

1. An aluminum nitride sintered product which is made mainly of aluminum nitride and contains an yttrium compound in an amount of from 0.6 to 5 wt % as calculated as yttrium oxide, a vanadium compound in an amount of from 0.02 to 0.4 wt % as calculated as vanadium and carbon in an amount of from 0.03 to 0.10 wt % and which has a three-point bending strength of at least 45 kg/mm$^2$ and a thermal conductivity of at least 150 W/m·K, wherein lo crystal grains of aluminum nitride have an average grain size of at most 5 $\mu$m.

2. The aluminum nitride sintered product of claim 1, made by a process comprising:

blending a mixture of starting materials comprising from 0.6 to 5 wt. % of a yttrium compound, calculated as yttrium oxide, from 0.02 to 0.4 wt. % of a vanadium compound, calculated as vanadium, a carbon material, and an aluminum nitride material powder;

molding the mixture; and sintering the molded mixture in a non-oxidizing atmosphere.

3. The aluminum nitride sintered product of claim 2, wherein the vanadium compound starting material is selected from the group consisting of $V_2O_3$, $V_2O_4$, and $V_2O_5$.

4. The aluminum nitride sintered product of claim 2, wherein the yttrium compound starting material is selected from the group consisting of yttrium oxide and $Y_4Al_2O_9$.

5. The aluminum nitride sintered product of claim 2, wherein the aluminum nitride material powder starting material has an average particle size of at most 2 $\mu$m.

6. The aluminum nitride sintered product of claim 2, wherein the aluminum nitride material powder starting material has an amount of oxygen of at most 2 wt. %.

7. The aluminum nitride sintered product of claim 2, wherein the aluminum nitride material powder starting material has an amount of oxygen of at most 1.5 wt. %.

8. The aluminum nitride sintered product of claim 2, wherein the mixture of starting materials further comprises a binder, and the molded mixture is heated prior to sintering to remove the binder.

9. The aluminum nitride sintered product of claim 8, wherein the heating is carried out at a temperature lower than 460° C.

10. The aluminum nitride sintered product of claim 2, wherein the sintering is carried out at a temperature of 1900 to 2000° C.

11. The aluminum nitride sintered product of claim 8, wherein the binder is polyvinylbutyral or an acrylic resin.

12. The aluminum nitride sintered product of claim 11, wherein the binder further comprises a compound selected from the group of a dispersant, a plasticizer, and a solvent.

* * * * *